United States Patent [11] 3,536,117

[72] Inventor Victor R. Huber
 Akron, Ohio
[21] Appl. No. 797,412
[22] Filed Feb. 7, 1969
 Division of Ser. No. 640,688, May 23, 1967,
 now Pat. No. 3,480,064.
[45] Patented Oct. 27, 1970
[73] Assignee The B.F. Goodrich Company
 New York, New York
 a corporation of New York

[54] DUAL CHAMBERED TIRE AND INFLATION MEANS
 5 Claims, 3 Drawing Figs.
[52] U.S. Cl. ..................................................... 152/340,
 152/427, 137/223, 137/234.5
[51] Int. Cl. ..................................................... B60c 5/02,
 B60c 29/00

[50] Field of Search ............................................ 152/340,
 342, 343, 427

[56] References Cited
 UNITED STATES PATENTS
2,122,740 7/1938 Eckenroth ..................... 277/1
2,150,648 3/1939 Eger ............................. 152/342
3,361,153 1/1968 Krohn et al. .................. 137/234.5
3,422,836 1/1969 Hawkes ......................... 137/234.5

Primary Examiner—Arthur L. La Point
Assistant Examiner—Robert Saifer
Attorneys—Joseph Januskiewicz and W.A. Shira,Jr ABSTRACT: A safety tire having an inner tire mounted in an outer tire with a valve operative to provide selective gauging, deflation or pressurization of the respective dual chambers defined by the outer tire, inner tire and the rim.

Patented Oct. 27, 1970  3,536,117

INVENTOR
VICTOR R. HUBER
Joseph Januszkiewicz
ATTORNEY 3,536,117

DUAL CHAMBERED TIRE AND INFLATION MEANS

CROSS REFERENCE TO RELATED APPLICATIONS

This application is a division of copending application Ser No. 640,688 filed May 23, 1967, now U.S. Pat. No. 3,480,064.

BACKGROUND OF THE INVENTION

This invention relates to a tire and more particularly to a safety tire having an inner tire mounted in an outer tire and cooperative with a valve that provides selective inflation or deflation of the separate chambers formed by the outer tire, inner tire, and the rim which receives such tires.

In dual chamber tires where the chambers are structurally separate, it is advantageous to provide a single valve means through which it is possible to inflate, deflate and gauge such chambers separately. Separate oversized valves have been used for the separate inner and outer tires; however, such means is expensive and impractical as it requires special rims and accessories. Others have proposed to use a valve structure that has two separate air valves operating through two separate air passages; however, in view of the standardization in the industry, a redesign of the rim to accommodate such change would be impractical.

To provide a solution to the above problems, the present invention provides a dual chamber tire having a vlave that is economical to manufacture, simple and useable on the ordinary conventional rim whether such be standard passenger, airplane or truck rim, facilitating the gauging, inflating and deflating of either chamber quickly and without difficulty. No special tools are necessary to operate such valve structure, and there is no leakage between chambers through such valve structure. Such valve is adaptable for use with a multichamber tire assembly while mounting a positive seal for all such chambers.

BRIEF SUMMARY OF THE INVENTION

The present invention contemplates the use of a movable valve stem cooperative with a control element that selectively moves the stem for communicating a pressure source with one pair of spaced ports which provide selective inflation and deflation of spaced chambers as well as the gauging thereof.

Figure 1:
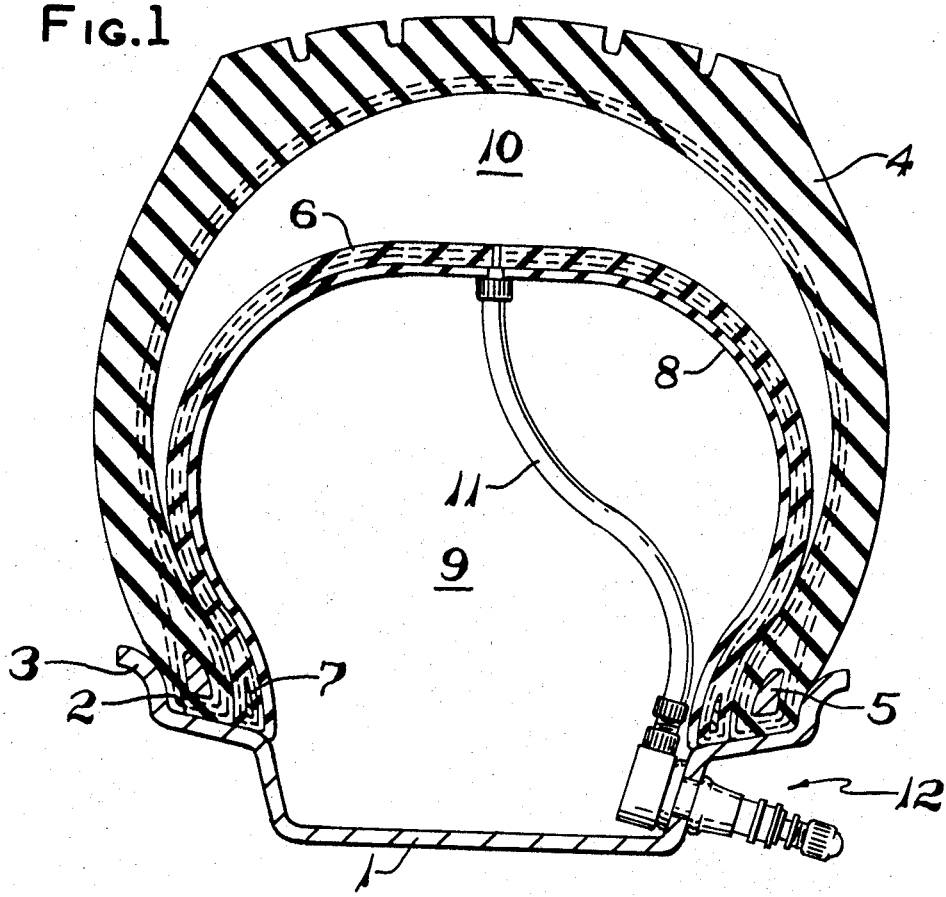
FIG. 1 is a cross-sectional view of a safety tire embodying the invention.

Referring to the drawings and more particularly to FIG. 1 there is shown a tire rim 1 having spaced bead seats 2 with retaining flanges 3 adjacent thereto. A tubeless outer tire 4 having bead 5 is mounted on the rim 1. An inner tire 6 having beads 7 and rubberized reinforced material such as fabric extending therethrough has the edges thereof seated adjacent to the respective edges of the outer tire 4 on the bead seats 2. A butyl liner 8 is formed with the inner tire 6 which in cooperation with the rim 1 defines an inner chamber 9. A chamber 10 is defined by the inner tire 6 and the outer tire 4, which chamber 10 is adapted to be connected via a hose 11 and valve 12 to a suitable pressure source.

Figure 2:
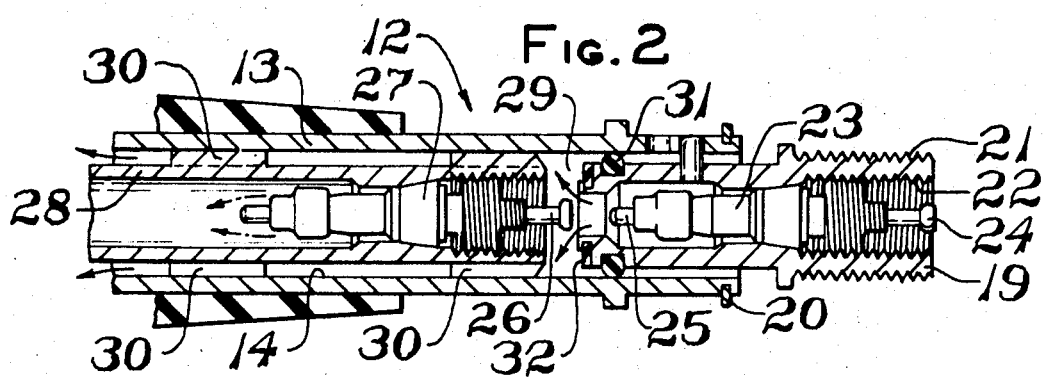
FIG. 2 is a cross-sectional view of the disclosed valve.
Figure 3:
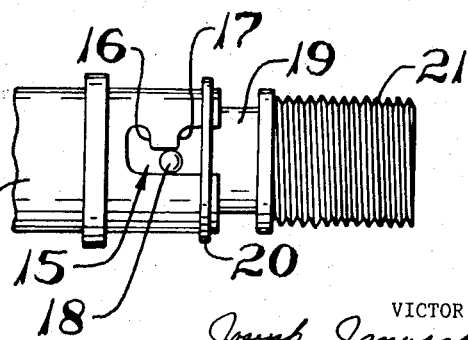
FIG. 3 is a fragmentary view of the one end portion of the tire valve shown in FIG. 2.

Valve 12 (FIG. 2) has an outer longitudinally extending tubular valve body 13 with a central bore 14 extending longitudinally therethrough. Such tubular valve body 13 may be mounted in a rubberized plug for connection to the rim 1 or in any other suitable manner as is old and well known in the art, such as a long stem to the central portion of a standard wide base truck rim and thence through the rim. One end of such tire valve 12 has detent means comprising a U-shaped recess 15 (FIG. 3) with leg portions 16 and 17 adapted to selectively receive a pin 18 mounted in a tubular control valve member 19. The outer most end portion of tire valve 12 has a snap-on retaining ring 20 (FIG. 3) which confines the outward movement of pin 18 thereby restricting such movement between the respective leg recess portion 16 and 17 for a prupose to be described. The outer most end portion of control valve member 19 is externally and internally threaded as at 21 and 22 respectively. Externally threaded portion 21 receives the conventional valve cap to protect a standard tire valve core member 23 which is threadedly secured to the internally threaded portion 22. One end portion of valve core member 23 has a valve stem 24 which extends outwardly therefrom to control the inflation and deflation of the central bore 14 in the conventional manner via an inflating nozzle. The other end portion of valve core member 23 has an outwardly extending projection 25 which is adapted to contact a valve stem 26 of a conventional standard valve core member 27 which is threadedly secured to a tubular member 28, which tubular member 28 in turn is securely mounted within the central bore 14 of valve body 13. The clearance space in bore 14 between valve core member 27 and valve core member 23 defines a chamber 29. Tubular member 28 has a plurality of outwardly extending spacers 30 integral therewith to properly position and space such member 28 within valve body 13 to permit passage of air therebetween as shown by the arrows in full line of FIG. 2, yet maintain such tubular member 28 in axial alignment relative to valve body 13. Control valve member 19 has an O-ring 31 mounted on the innermost peripheral end portion which abuttingly engages the peripheral portion of the central passageway 14 to provide an air seal for chamber 29 defined by such central passageway 14 between the respective valve core members 23 and 27. In addition, control valve member 19 has a flat annular seal member 32 on the end portion thereof which is adapted to abuttingly engage the end portion of the tubular member 28 when the pin 18 of such control valve member 19 is in leg portion 16 of recess 15.

In the operation of the tire valve as described above the operator may selectively position control valve member 19 axially inwardly or outwardly until pin 18 is positioned within leg portions 16 or 17 of recess 15. With pin 18 positioned in leg portion 17, the respective valve cores 23 and 27 are substantially in the positions shown in FIG. 3 wherein the projection 25 of valve core member 23 is out of contact with the stem 26 of valve core member 27. Upon pressurization of chamber 29 through the use of a conventional pressure hose and nozzle acting on valve stem 24, pressurized fluid will flow through valve core member 23 pressurizing chamber 29 and flows between the clearance space provided by the tubular member 28 and valve body 13 to pressurize one of the dual chambers of the tire. Upon release of valve stem 24 by the pressure hose, the pressure in pressurized chamber 29 will be stabilized and be maintained at such preset level. In rotating control valve member 19 and axially moving such valve member until pin 18 is positioned within leg portion 16 of recess 15, projection 25 on valve core member 23 will depress valve stem 26 of valve core member 27 conditioning the pressurization or deflation of the other of the dual chambers of the tire, through valve core members 23 and 27. Through the use of a conventional pressure hose and nozzle acting on valve stem 24, pressurized fluid will flow through both valve core members 23 and 27 and be directed through tubular member 28 as depicted by the dashed arrows in FIG. 2. Gauging is accomplished in a conventional manner as well as deflation of such chambers by the manipulation of control valve member 19 for selectively moving such control valve member 19 inwardly or outwardly such that the stem 26 may be depressed or released.

I claim:

1. A safety tire having an outer tire member and an inner tire member mounted therein, said inner and outer tire members being mounted onto a vehicle rim to define a pair of closed chambers, a tire valve attached to said rim, said tire valve having a valve body with a passageway extending therethrough, a control member mounted in one portion of said valve body, said control member having a valve core therein operative to control the passage of air therethrough, detent means interconnecting said control member with said valve body for selectively positioning said control member in a first or a second position, a tubular valve member with a central bore therethrough securely mounted within said valve body said tubular valve member having a clearance space between its outer periphery and the inner periphery of said valve body to provide communication with one of said chambers, said tubualr valve member having a valve core mounted therein operative to communicate with said bore to provide communication with the other of said chambers, said control member in said first position connects said valve core of said control member with said clearance space, and said control member in said second position connects said valve core of said control member with said bore through said valve core of said tubular valve member to said other chamber.

2. A tire valve for use in inflating an inner compartment and an outer compartment comprising a tubular valve body, said valve body mounted in an opening in the tire rim, said valve body having a bore extending longitudinally therethrough, a tubular member with a central passageway therethrough mounted within the bore of said valve body, said tubular member having a clearance space between said bore of said valve body and the outer periphery thereof to communicate with one of said compartments, the one end portion of said tubular member being threaded to receive a standard valve core with a valve stem extending outwardly therefrom, said central passageway of said tubular member communicating with the other of said compartments, a control member mounted on the outer end protion of said valve body, said control member having a valve core, said control member movable in an axial direction to selectively move said valve core therein into and out of abutting contact with said valve core of said tubular member to selectively condition the inflation or deflation of said compartments.

3. A tire valve as set forth in claim 1 wherein said detent means on said valve body comprises a pair of interconnected recesses cooperative with a projection on said control member to hold said control member in said first or said second position.

4. A tire valve as set forth in claim 3 wherein said control valve member has an annular sealing means on one end portion thereof abuttingly engaging one end portion of said tubular valve member upon movement of said control member into said second position to seal communication between said valve core in said control member and said clearance space.

5. A tire valve for use with a tire having its interior divided into an inner compartment and an outer compartment; said tire valve comprising a valve body having a central bore extending therethrough; a tubular member located in said bore of said valve body having clearance space therebetween; said tubular member having a valve core mounted in one portion thereof with a stem projecting outwardly therefrom to control the flow of fluids therethrough; the end portion of said valve body having a control member rotatably mounted and axially movable therein; recess means on said valve body limiting the axial and rotatable position of said control member therein; said control member movable between a first axial position and a second axial position; said control member having a valve core mounted therein; clearance space between said control member and said tubular member defining a chamber; said control member in said one position operative to direct pressurized fluid through said valve core mounted therein through said chamber to said clearance space and in said second position operative to direct pressurized fluid through both of said valve cores into said bore of said tubular member; and said control member having sealing means thereon operative to abuttingly engage said tubular member to seal off said chamber when said control member is in said second position.